United States Patent Office 3,478,665
Patented Nov. 18, 1969

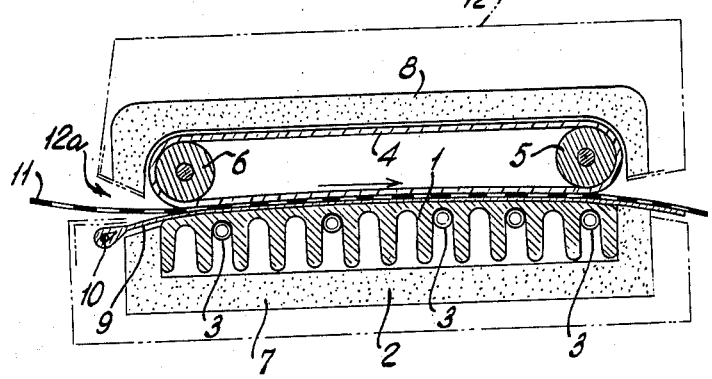
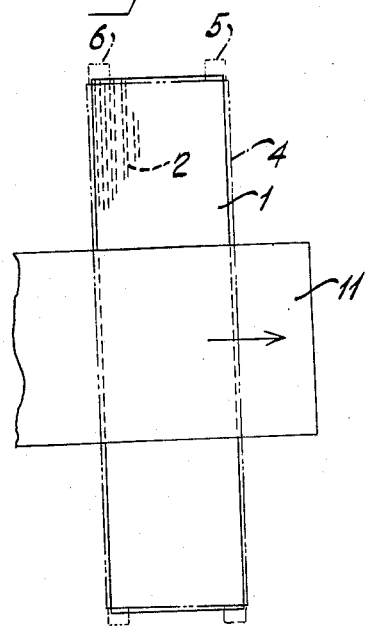

3,478,665
DEVELOPING APPARATUS FOR SENSITIVE
PAPER
Minoru Umahashi, Tokyo, and Hitoshi Yamakawa, Fujisawa-shi, Japan, assignors to Kabushiki Kaisha Ricoh, Tokyo, Japan, a corporation of Japan
Filed July 19, 1967, Ser. No. 654,514
Claims priority, application Japan, July 27, 1966, 41/71,147
Int. Cl. G03d 3/00; F26b 19/00; F24h 3/02
U.S. Cl. 95—89                                   3 Claims

ABSTRACT OF THE DISCLOSURE

A developing apparatus for a copying machine including a heat table equipped with longitudinal ribs with heating elements between the ribs, and a belt for moving a sheet transversely across the top of said table.

Background of the invention

This invention relates to developing apparatus to be used with the heat development type of sensitive paper. The apparatus provides a minimum difference in temperature on different parts of the heating table to which the sensitive paper is supplied by a feeding belt.

Said temperature difference is produced when sensitive paper of narrower width than maximum width is used. For example, the central portion of said heated portion of the heating table is assumed to be heated to about 130° C. and when a sensitive paper having normal temperature is passed through said heated portion continuously, temperature at the central portion of said heating table becomes lower than the temperature at both ends of said heating table, and thus produces a temperature difference on the top of the heating table.

The heat developing apparatus is provided with an automatic temperature controller for holding a constant temperature at all times on the heating table. However, as stated above, when partial temperature difference exists, the point of operation of said controller is not necessarily the same temperature as other parts of the table, and proper temperature control does not result. For example, if said automatic temperature controller is installed on the central portion of the heating table, or on the portion where temperature fall is produced by using sensitive paper of narrower width than the width of the feeding belt, a resulting abnormal temperature rise may be produced at both ends of the heating table.

When said automatic temperature controller is installed at the end of the heating table, deterioration of development effect result because of temperature fall of the heating table on the central portion thereof.

Temperature difference produced on the heating table is not only a disadvantage to temperature control as stated above, but also produces creases in the sensitive paper by the vapor condensed from the steam evaporated from the sensitive paper, and thus spoils the sensitive paper.

For maintaining minimum temperature difference on the surface of the heating table, such a table may be employed which has a large thermal capacity so that heat absorbed by the sensitive paper is negligible. However, when such heating table is employed, it requires considerably longer time to heat the heating table to establish proper temperature and longer cooling time after operation to cool the machine. Further, when the heating table with large thermal capacity is employed, weight of the apparatus is increased and it is inconvenient to handle, or to transport the apparatus. To remove above defects from the apparatus, this invention provides a plurality of fins or ribs on the undersurface of the heating table parallel to the longitudinal axis thereof with heating elements arranged between said ribs adjacent to the bottom of the table.

Summary

An object of the present invention is to maintain a uniform temperature over the active surface of the heating table of a developing apparatus of a copying machine regardless of the dimensions of the paper being heated. This is accomplished by the use of longitudinal ribs on the underside of the table with heating elements therebetween. A protective sheet may be interposed between the table top and the sheet to be developed.

Brief description of the drawings

FIG. 1 is a right angle section transversely of the longitudinal axis of the heating table where the sensitive sheet moves over the table top under guidance of a feed belt.

FIG. 2 is a plan view showing a sheet crossing at right angles to the longitudinal axis of the top of the heating table.

Description of the preferred embodiment

The invention will be described with reference to the drawings illustrating one embodiment thereof, wherein reference numeral 1 designates the heating table provided with a number of longitudinal fins or ribs 2. The numeral 3 designates heating elements of the rod type which are provided on the underside of the table between the ribs. These heating elements are preferably electric elements under the control of a thermostat (not shown) located adjacent to the top of the heating table for the purpose of automatically maintaining a constant temperature on the table. The numeral 4 shows a conveyor belt for the sensitive paper to be developed. It is fixed between rollers 5 and 6 and driven in the direction of the arrow (FIG. 1) by means of driving roller 5. This belt may be made of a rubber-like material which is not adversely affected by the chemicals in the sensitive paper, nor by the heat generated by the heating table. At 7 is shown heat insulation for the lower side of the heating table, and at 8 is shown the insulating material for the upper side of the heating table above the conveyor belt 4. At 9 is shown a heat resistant sheet fixed at one end to the stationary horizontal rod 10 and disposed transversely of the longitudinal axis of the heating table in the path of the sensitive sheet to be developed. At 11 is shown a sensitive sheet of heat developing type which is introduced between the conveyor belt and the heat resistant sheet 9 through the aperture shown at 12a. Preferably the sheet 9 is made of glass fiber which is quite resistant to heat and chemicals, and makes a very smooth surface with a low coefficient of friction for the sensitive paper sheet to move over under the urging of the conveyor belt 4. This sheet not only serves to make a smooth path for the sensitive paper, but also helps to protect it from any "hot spots" on the table, and thus, further aid in distributing the heat evenly over the paper being developed.

FIG. 2 shows a sensitive paper in a form much narrower than the length of the heating table 1. During the developing operation the sheet 11 moves in the direction of the arrow across the top of the table and at right angles to the longitudinal axis thereof. In the case illustrated in FIG. 2, the tendency is for the heating table to have a relatively low temperature near the middle thereof and a relatively high temperature at the upper and lower ends thereof, because the sensitized sheet passing over the table continuously takes heat away from the table where the sheet is in contact with it.

However, this tendency to overheat the ends of the table and underheat the middle thereof, is controlled and counter-acted by ribs on the underside of the table with the heating rods therebetween. With the construction shown the difference in temperature becomes nearly insignificant.

We claim:

1. In a developing apparatus for a copying machine, a heat table, longitudinal ribs on the underside of said table, heating elements arranged between said ribs adjacent to the underside of said table, conveyor means for moving a sheet to be developed transversely across the top of said table and a heat resistant sheet which lies transversely across the top of said table in the path of a sheet to be developed as it moves over the top of said table.

2. An apparatus as set forth in claim 1, wherein said conveyor means cooperates with said heat resistant sheet to move a sheet to be developed across said heat resistant sheet from one side of said heat table to the other.

3. In a developing apparatus for a copying machine, a heat table, longitudinal ribs on the underside of said table, heating elements arranged between said ribs adjacent to the underside of said table, and conveyor means for moving a sheet to be developed transversely across the top of said table, said conveyor means being over the top of said table and adapted to move a sheet to be developed from one side of said table to the other side.

References Cited

UNITED STATES PATENTS

| | | | |
|---|---|---|---|
| 2,674,809 | 4/1954 | Meienhofer | 34—48 |
| 2,761,364 | 9/1956 | Cross | 98—94 X |
| 2,761,365 | 9/1956 | Bridgewater | 98—94 |
| 2,774,107 | 12/1956 | Davis | 165—120 X |

ROBERT A. O'LEARY, Primary Examiner

THEOPHIL W. STREULE, Assistant Examiner

U.S. Cl. X.R.

34—48; 165—120